United States Patent [19]
Caruso et al.

[11] Patent Number: 5,483,449
[45] Date of Patent: Jan. 9, 1996

[54] INFLATABLE RESTRAINT SYSTEM AND METHOD OF CONTROLLING DEPLOYMENT THEREOF

[75] Inventors: Christopher M. Caruso; Douglas A. Nunan, both of Kokomo; Charles A. Gray, Noblesville, all of Ind.

[73] Assignee: Delco Electronics Corporation, Kokomo, Ind.

[21] Appl. No.: 220,646

[22] Filed: Mar. 31, 1994

[51] Int. Cl.$^6$ ............................. B60R 21/12; B60R 21/32
[52] U.S. Cl. .................. 364/424.05; 340/669; 307/10.1; 280/735; 180/282
[58] Field of Search ........................ 364/424.05; 340/436, 340/669; 307/10.1; 280/734, 735; 180/274, 282

[56]  References Cited

U.S. PATENT DOCUMENTS

| | | | |
|---|---|---|---|
| 3,762,495 | 10/1973 | Usui et al. | 280/735 |
| 3,911,391 | 10/1975 | Held et al. | 280/735 |
| 4,985,835 | 1/1991 | Sterler et al. | 364/424.05 |
| 4,994,972 | 2/1991 | Diller | 364/424.05 |
| 5,014,810 | 5/1991 | Mattes et al. | 180/268 |
| 5,021,678 | 6/1991 | Diller | 307/10.1 |
| 5,036,467 | 7/1991 | Blackburn et al. | 364/424.05 |
| 5,037,129 | 8/1991 | Fritz et al. | 280/734 |
| 5,067,745 | 11/1991 | Yoshikawa | 280/735 |
| 5,073,860 | 12/1991 | Blackburn et al. | 364/424.05 |
| 5,109,341 | 4/1992 | Blackburn et al. | 364/424.05 |
| 5,182,459 | 1/1993 | Okano et al. | 307/10.1 |
| 5,185,701 | 2/1993 | Blackburn et al. | 280/735 |
| 5,189,311 | 2/1993 | Moriyama et al. | 307/10.1 |
| 5,339,242 | 8/1994 | Reid et al. | 364/424.05 |

OTHER PUBLICATIONS

U.S. Ser. No. 07/798,487, Oberlander, et al. (U.S. pending appl.), filed Nov. 26, 1991.

*Primary Examiner*—Kevin J. Teska
*Assistant Examiner*—Tyrone V. Walker
*Attorney, Agent, or Firm*—Mark A. Navarre

[57]  ABSTRACT

A system and a method are provided wherein an air bag deployment command is issued if a crash event exceeds both an energy boundary curve and an oscillation boundary curve, and, furthermore, following detection of an onset of the crash event, filtered acceleration data exceeds an acceleration threshold. The threshold is preferably two-tiered to help discriminate between deployment and non-deployment events.

11 Claims, 2 Drawing Sheets

5,483,449

INFLATABLE RESTRAINT SYSTEM AND METHOD OF CONTROLLING DEPLOYMENT THEREOF

CROSS REFERENCE TO RELATED APPLICATIONS

This application is related to U.S. patent application Ser. No. 07/798,487, filed Nov. 26, 1991, entitled "Method And Apparatus For Vehicle Crash Discrimination" and U.S. patent application Ser. No. 07/797,850, also filed Nov. 26, 1991, entitled "Method And Apparatus For Vehicle Crash Distinction", both of which are incorporated herein by reference.

TECHNICAL FIELD

This invention relates to Supplemental Inflatable Restraint (SIR) or air bag methods and systems for motor vehicles and, more particularly, to improved systems and methods for predicting the severity of a crash, based on acceleration data gathered at the onset of the crash, and issuing a command when the need for deployment of the air bag is established.

BACKGROUND ART

Supplemental Inflatable Restraint (SIR) systems are widely used in motor vehicles. Controllers for use in such SIR systems should be robust and immune to unwanted deployment. A velocity boundary curve (VBC) algorithm is used in an electronic crash sensor in the above U.S. patent application Ser. No. 07/797,850 for detecting a high speed pole impact early in a crash event. The sensor disclosed therein utilizes acceleration signals measured by a micromachined accelerometer located in the controller that is mounted in the vehicle passenger compartment as illustrated in FIG. 1. In order to achieve timely discrimination, the VBC utilizes four threshold curves digitized and stored in calibration lookup tables. The acceleration signal is digitized, then transformed into forms of jerk, acceleration, and velocity that are compared to four boundary curves that represent thresholds for absolute integral of jerk, partial energy, occupant-to-vehicle relative velocity, and a reset velocity parameter. These four thresholds are values that are based on the deployment and non-deployment crashes, rough road signals, and abuse signals used for calibration.

In the above U.S. patent application Ser. No. 07/798,487, a method of discriminating between air bag deployment and non-deployment events based on vehicle acceleration data is disclosed. When vehicle acceleration data reaches a threshold indicative of the onset of an event, a velocity computation cycle is initiated which computes velocity by integrating the acceleration data and comparing the velocity each millisecond during the cycle with data from a time dependent velocity boundary curve which separates low severity and high severity events in the velocity versus time domain.

Current acceleration-based algorithms exhibit some sensitivity to random noise and vibration events. Also, large signal band charges can dominate oscillation calculations of such algorithms. These changes can occur in low speed angle and pole events. Some applications show some sensitivity to rough road and abuse triggering, thereby requiring relatively high velocity boundary curve levels.

SUMMARY OF THE INVENTION

An object of the present invention is to provide an inflatable restraint system and method of controlling deployment thereof, which solves or minimizes the above-noted problems of acceleration-based algorithms.

In carrying out the above object and other objects of the present invention, an inflatable restraint system for a motor vehicle is provided. The system includes an inflatable device for protecting an occupant of the vehicle in a crash event, accelerometer means mounted on the vehicle and processor means programmed to process acceleration data from said accelerometer means to detect an onset of a crash event and to thereafter filter the acceleration data to obtain filtered acceleration data following detection of the onset of the crash event and to determine whether the crash event is severe enough to deploy the device. The crash event is determined to be severe enough to deploy the device if: (1) the magnitude of a change of velocity of the vehicle following the onset of the crash event exceeds a time dependent profile of at least one other non-deployment event, (2) the magnitude of an integral of the absolute value of a derivative of the filtered acceleration data exceeds a time dependent profile of at least one other non-deployment event, and (3) the magnitude of the filtered acceleration data exceeds an acceleration threshold value.

Still further in carrying out the above object and other objects of the present invention, a method is provided for controlling deployment of an inflatable restraint system for a motor vehicle. The method includes the steps of sensing vehicle deceleration and comparing the vehicle deceleration sensed with a deceleration threshold to detect an onset of a crash event. The method also includes the steps of integrating the sensed vehicle deceleration following detection of the onset of the crash event to determine a change in velocity value and comparing the change in velocity value with a velocity threshold value. The method further includes the steps of filtering vehicle deceleration following the onset of the crash event to obtain filtered deceleration, integrating the absolute value of a derivative of filtered deceleration to determine an oscillation value and comparing the oscillation value with an oscillation threshold value. The method finally includes the steps of comparing the filtered deceleration with a deceleration threshold value and commanding deployment of the restraint system when both the velocity and the oscillation threshold values are exceeded and when the filtered deceleration exceeds the deceleration threshold value.

The advantages accruing to the systems and method of the present invention are numerous. For example, the system and method:

1. Provide rough road immunity through acceleration discrimination, thereby reducing required velocity boundary curve levels for crash impact events;

2. Filter noise content to reduce sensitivity of oscillation calculation to random noise and vibration events;

3. Limit the oscillation measure contribution from any single sample to minimize sensitivity in low speed angle and pole events; and 4. Create necessary robustness to detect difficult crash events.

The above object and other objects, features, and advantages of the present invention are readily apparent from the following detailed description of the best mode for carrying out the invention when taken in connection with the accompanying drawings.

DETAILED DESCRIPTION OF THE BEST MODE

Figure 1:
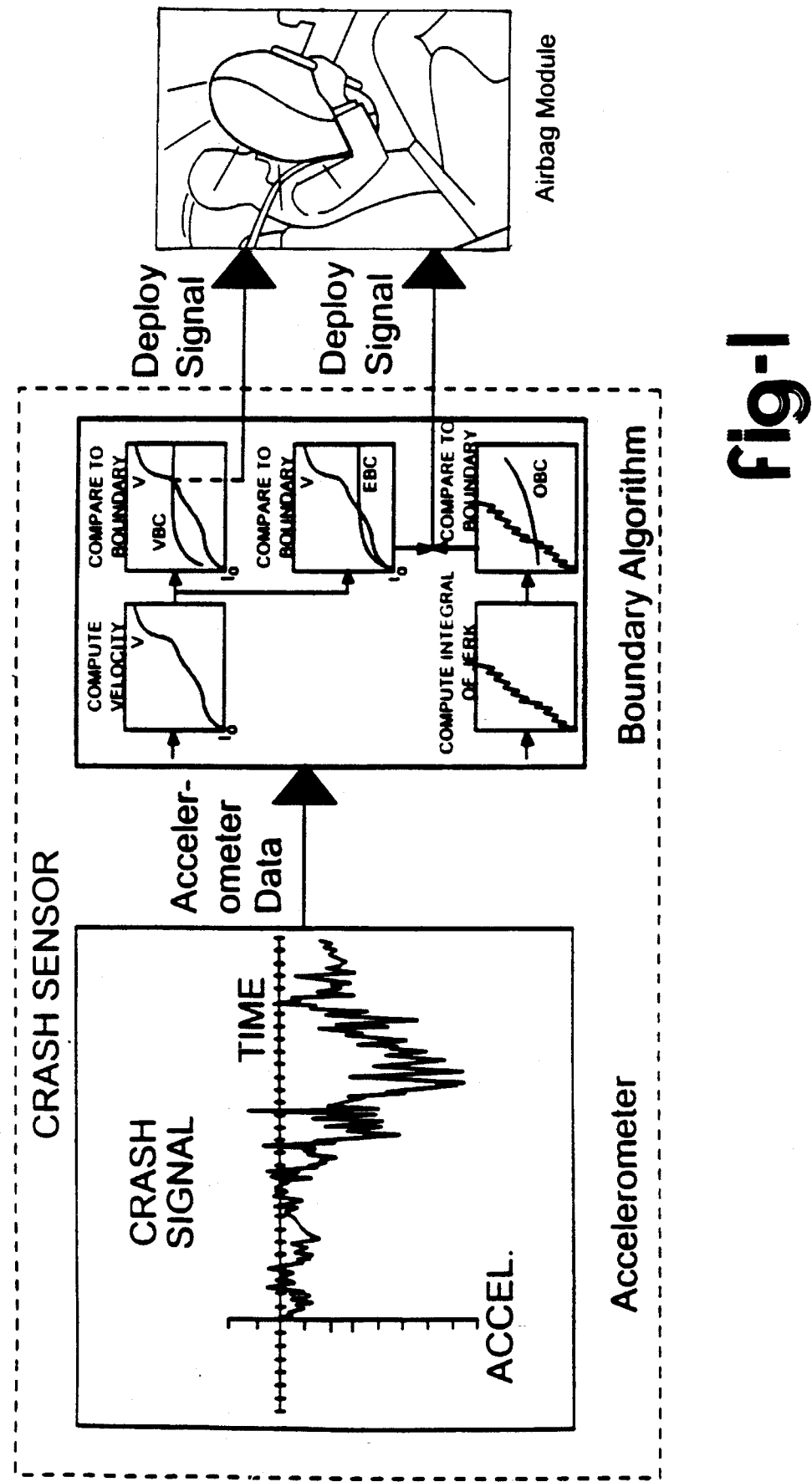
FIG. 1 is a schematic view illustrating the invention of the above-noted applications.

Referring now to FIG. 1, crash sensors process the acceleration at their location in the vehicle and provide a signal for air bag inflation when the processed acceleration meets a specified criterion.

There are many candidate locations for an accelerometer of the sensor, including the cowl, the center tunnel, and under the front passenger seat.

Velocity Boundary Curve (VBC) is defined as a curve that lies above a non-deployment composite curve over a prescribed time interval (on a velocity versus time graph), and is separated from a composite curve (not shown) by either a fixed or percentage amount representing a desired safety margin. As is more fully described in the above-noted application Ser. No. 07/798,487, if and when the change in vehicle velocity, as indicated by the acceleration data, exceeds the VBC, an air bag deployment enable command is issued.

An oscillation boundary curve (OBC) and an energy boundary curve (EBC) developed for one car line are respectively shown. As is more fully described in the above-noted application Ser. No. 07/797,850, the firing time for an air bag is based on crossing both the OBC and EBC together with the improvements more fully described below.

Figure 2:
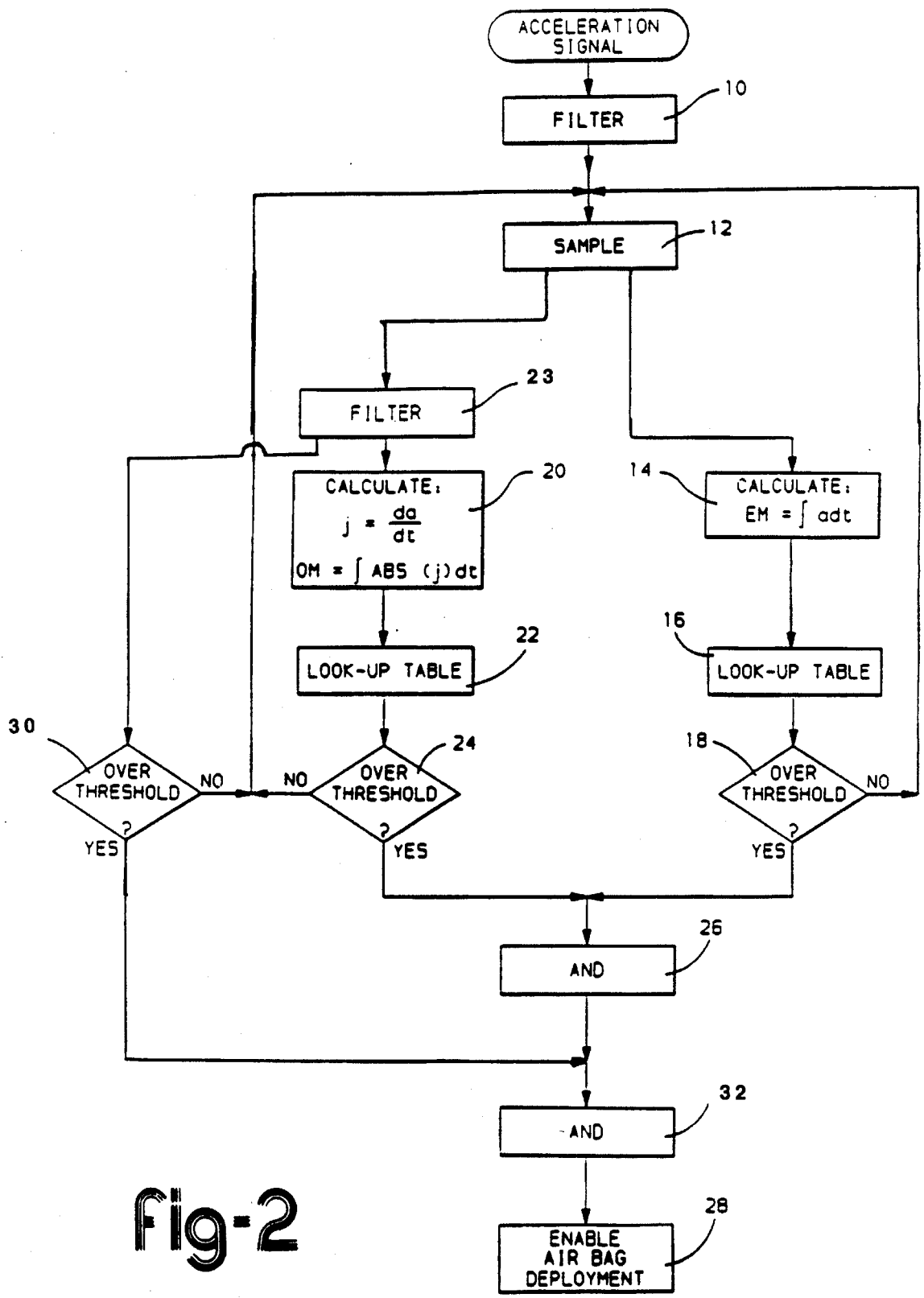
FIG. 2 is a flow chart depicting the overall method of the invention.

The algorithm of the present invention is illustrated in FIG. 2. As in the aforementioned applications, the acceleration signal is filtered at 10 and sampled at 12 and compared with a threshold acceleration. If an acceleration is detected that surpasses a predetermined threshold, then it is assumed that the vehicle is undergoing an impact and discrimination calculations begin. The optimal acceleration threshold is preferably 1.5 to 2.0 g. A 312 HZ (+/− 35%) R-C low pass filter was used and the sampling rate was 1 point per 625 microseconds.

If the acceleration threshold is exceeded, the acceleration data is integrated at 14 to obtain a velocity value indicative of kinetic energy and compared with a value in look-up table 16 which represents the velocity versus time data for the energy boundary curve. If the velocity threshold, for the look-up table time entry point following onset of the crash, is exceeded as determined by a COMPARE function 18, the first of the three-part deployment criteria is met.

A delay associated with the EBC performs the delay same function as a delay associated with the VBC as described in U.S. Ser. No. 07/798,487. The initial periods of the boundary curve is set to a very high level to prevent triggering during this initial period and allow time to potentially reset a non-deploy condition (such as abuse or drop test) using the inactivity reset or the RBC reset. Typical values used for both these parameters is 10 MS.

The accelerometer data is also used to calculate an oscillation measurement at 20 which is compared with an oscillation threshold value in look-up table 22 for the appropriate time into the crash. However, because some applications have shown some sensitivity of the oscillation calculation to variations in bracket noise and vehicle variations, a low pass software filter is provided at 23 to lower the frequencies that reach the oscillation computation. The optimal frequency for the filter 23 is between 35 and 140 HZ and is preferably between 64 and 74 HZ, depending on the sample rate.

Additionally, it has been observed that large signal level changes can completely dominate the oscillation calculation, even though they only last a short duration. Oscillation is a characteristic loading and yielding of the structure which is particularly pronounced in pole and angle impacts, and thus, they evolve over a longer time duration. Thus, limits of the maximum and minimum oscillation change per sample is provided herein.

A high limit is the maximum G change that can be added to the accumulated oscillation in any one sample. This significantly reduces the sensitivity to noise and vibration as well as to short duration, high G, singular changes.

A low limit is considered a noise level. Oscillation is not accumulated if the signal is simply showing random noise and not significant structural loading and yielding. This can significantly reduce the accumulated oscillation levels seen in benign events.

A typical value for the high limit is between 1.0 and 2.0 g's and a typical value for the low limit is between 0.25 and 0.5 g's. If the oscillation threshold value is exceeded as determined by a COMPARE function 24, the second of the three part criteria is met. If only one or neither of the thresholds are exceeded as provided at block 26, then the air bag enable command is not generated as provided at block 28.

Another aspect of the present invention relates to rough road and abuse immunity. Some applications have shown some sensitivity to rough road and abuse triggering, while after reviewing the acceleration data, it was clear that the acceleration signals were benign, but tended to create velocities which could approach the signal levels of certain barrier type tests, particularly pole and angle impacts. Additionally, abuse events tended to be short duration, high G events which created significant initial velocity, which would eventually cross the VBC because the RBC (described in the above applications) was too low to cause the event to reset.

Thus, two additional modifications have been made to improve immunity in these areas. First, the inactivity reset now runs parallel with the RBC instead of serially, thus improving the ability to get abuse events to reset as early as practical.

Additionally, a two-tiered minimum G threshold is provided by a compare function 30 to create two distinct filtered G "arming functions." Similar to the oscillation boundary, the minimum G threshold is set up by establishing an initial level that only permits severe impacts (30 and 35 mph frontals and higher) to pass. After some predetermined time, the threshold lowers to a low level that corresponds to the minimum G threshold for all other deployment desired events. A typical value for the high level is between 10 and 15 g's. A typical value for the low level is between 4 and 7 g's. A typical value for the predetermined time is between 20 and 30 msec.

If the acceleration threshold value is exceeded as determined by the compare function 30, the threshold of the three-part criteria is met as determined by an AND function 32. If any one of the three thresholds is not met, the air bag enable command is not generated at block 28.

While the best mode for carrying out the invention has been described in detail, those familiar with the art to which this invention relates will recognize various alternative designs and embodiments for practicing the invention as defined by the following claims:

We claim:

1. A method of controlling deployment of an inflatable restraint system for a motor vehicle, the method including the steps of sensing vehicle deceleration, comparing the vehicle deceleration sensed with a deceleration threshold to detect an onset of a crash event, integrating the sensed vehicle deceleration following detection of the onset of the crash event to determine a change in velocity value and comparing said change in velocity value with a velocity threshold value, wherein the improvement comprises the steps of:

filtering vehicle deceleration following detection of the onset of the crash event to obtain filtered deceleration;

comparing the filtered deceleration with a deceleration threshold value;

integrating the absolute value of a derivative of filtered deceleration to determine an oscillation value and comparing said oscillation value with an oscillation threshold value; and commanding deployment of the restraint system when both said change in velocity value exceeds said velocity threshold value and said oscillation value exceeds said oscillation threshold value and when the filtered deceleration exceeds the said deceleration threshold value.

2. The method as defined in claim 1 wherein said velocity and oscillation threshold values are variable over a predetermined time from the onset of said crash event.

3. The method of claim 2 wherein the velocity threshold values form a velocity boundary curve which is a composite of a plurality of non-deployment events, and wherein the oscillation threshold values form an oscillation boundary curve which is a composite of a plurality of non-deployment events.

4. The method of claim 2 wherein the velocity threshold values form a velocity boundary curve which is a composite of peak velocity values at a plurality of points in time for each of a plurality of non-deployment events, and wherein the oscillation threshold values form an oscillation boundary curve which is a composite of peak oscillation values at said plurality of points in time for each of said plurality of non-deployment events.

5. The method of claim 1 wherein the deceleration threshold value is variable over a predetermined time from the onset of said crash event.

6. The method of claim 5 wherein the deceleration threshold value is two-tiered.

7. The method of claim 1 further comprising the steps of sampling vehicle deceleration and limiting the minimum and maximum oscillation change per sample.

8. The method of claim 1 wherein the step of filtering is accomplished with a software-based, low-pass filter.

9. An inflatable restraint system for a motor vehicle, the system including an inflatable device for protecting an occupant of the vehicle in a crash event, accelerometer means mounted on the vehicle, and processor means programmed to process data from said accelerometer means to detect an onset of a crash event and to thereafter determine whether the crash event is severe enough to deploy the device, wherein the improvement comprises:

the processor means is also programmed to filter the data from the accelerometer means to obtain filtered acceleration data following detection of the onset of the crash event and said crash event is determined to be severe enough to deploy the device if: (1) the magnitude of a change of velocity of the vehicle following the onset of the crash event exceeds a time dependent change of velocity profile of a composite of a plurality of non-deployment events; (2) the magnitude of an integral of the absolute value of a derivative of the filtered acceleration data exceeds a time dependent profile of at least one other non-deployment event; and (3) the magnitude of the filtered acceleration data exceeds an acceleration threshold value.

10. The system of claim 9 wherein the acceleration threshold value is variable over a predetermined time from the onset of said crash event.

11. The system of claim 10 wherein the acceleration threshold value is two-tiered.

\* \* \* \* \*